United States Patent [19]

Kim

[11] Patent Number: 5,590,483
[45] Date of Patent: Jan. 7, 1997

[54] IMPLEMENT ATTATCHING DEVICE FOR CONSTRUCTION EQUIPMENT

[75] Inventor: Joon Y. Kim, Changwon, Rep. of Korea

[73] Assignee: Samsung Heavy Industries Co., Ltd., Seoul, Rep. of Korea

[21] Appl. No.: 501,222

[22] Filed: Jul. 11, 1995

[51] Int. Cl.$^6$ .............................. E02F 3/96; A01B 51/00
[52] U.S. Cl. ........................... 37/468; 172/272; 172/273; 414/723; 414/724
[58] Field of Search .................................. 172/272, 273; 37/468; 414/723, 724, 722, 912

[56] References Cited

U.S. PATENT DOCUMENTS

| 3,272,264 | 9/1966 | Antolini . | |
|---|---|---|---|
| 3,760,883 | 9/1973 | Birk | 414/723 |
| 4,030,624 | 6/1977 | Matthews | 172/272 |
| 4,984,957 | 1/1991 | Noguchi et al. | 414/723 |
| 5,419,673 | 5/1995 | Merhar | 172/272 |

FOREIGN PATENT DOCUMENTS

| 270504 | 6/1988 | European Pat. Off. | 37/468 |
|---|---|---|---|
| 31659 | 3/1980 | Japan | 414/723 |
| 143018 | 9/1982 | Japan | 172/272 |
| 98532 | 6/1983 | Japan | 414/723 |
| 65639 | 5/1990 | Japan | 414/723 |
| 2132584 | 7/1994 | United Kingdom | 414/723 |

Primary Examiner—Eric K. Nicholson
Assistant Examiner—Thomas A. Beach
Attorney, Agent, or Firm—Kenyon & Kenyon

[57] ABSTRACT

An improved implement attaching device for construction equipment is disclosed. The device has an implement mount link hinged to the arm of the construction equipment. A first bracket is provided on the rear wall of the implement and supports the link. A pair of key holes are provided on opposite sides of the first bracket. A pair of keys are provided on the link such that the keys are horizontally movable relative to the link to be inserted into or taken out of the key holes and thereby detachably attaching the implement to the implement mount link. The device also has a lever and a linkage for linearly moving the keys horizontally. The linkage achieves a pantographic motion in accordance with a turning motion of the lever and detachably attaches the implement to the link.

1 Claim, 4 Drawing Sheets

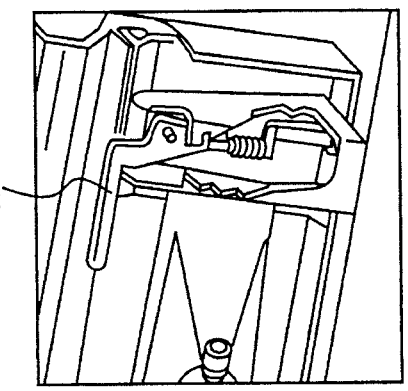
FIG. 2D
PRIOR ART
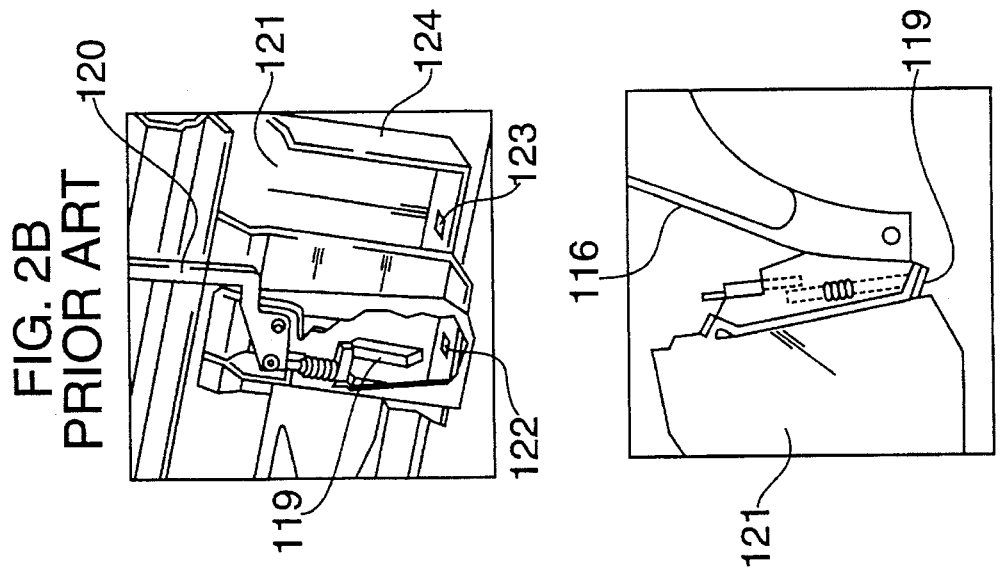
FIG. 2B
PRIOR ART
FIG. 2C
PRIOR ART
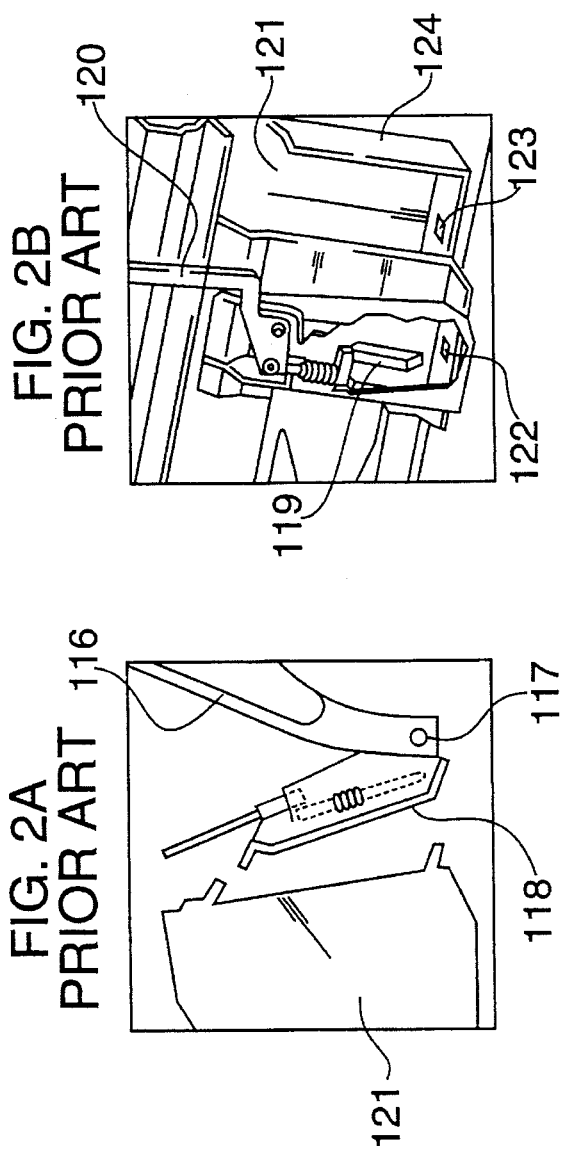
FIG. 2A
PRIOR ART

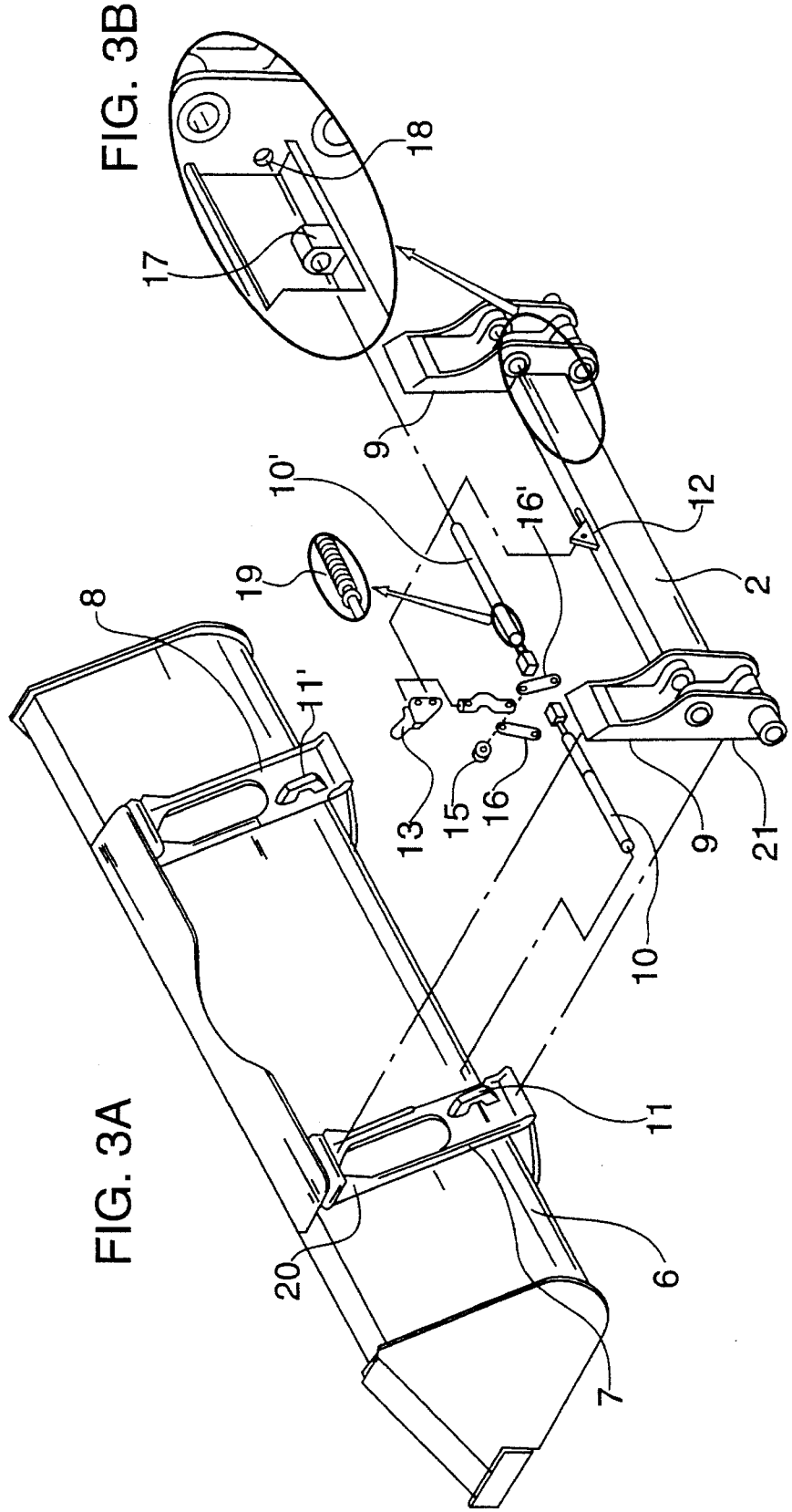

IMPLEMENT ATTATCHING DEVICE FOR CONSTRUCTION EQUIPMENT

BACKGROUND OF THE INVENTION

1. Field of the Invention

The present invention relates in general to a device for detachably attaching an implement, for example a bucket, to construction equipment, such as power excavators or loaders, and, more particularly, to a structural improvement in such a device for rapidly attaching the implement to an implement mount link of the construction equipment and thereby easily changing the implements of the construction equipment.

2. Description of the Prior Art

In typical construction equipment such as power excavators, booms, arms and the like, which are operated by their actuators, are mounted to the car body of the construction equipment. In addition, various implements such as buckets are selectively attached to an end of the arm. These implements are selectively attached to the arm as required by working conditions of the construction equipment.

A variety of devices for detachably attaching the implements to construction equipment have been proposed and used. Representative examples of the above devices are shown in FIGS. 1 and 2A–2D respectively.

In the typical implement attaching device shown in FIG. 1, the opposite side ends of an implement mount link 106 are mounted to their associated pin holes 102 and 103, which are formed in the opposite front ends of an arm 101, by means of pins 107 respectively. The link 106 is thus mounted to the arm 101. The opposite side ends of the link 106 are provided with lugs 104 and 105 respectively, each lug 104, 105 having a horizontal tube 111, 111'. The horizontal tubes 111 and 111' of the lugs 104 and 105 are inserted in the associated tube holes 110 of a pair of bottom brackets 109 provided on the rear wall of a bucket 108. The rear wall of the bucket 108 also includes a top bracket 113 having a hook hole 112. A pin 115 is coupled to a lever 114 mounted to the link 106. The pin 115 is inserted in the hook hole 112, thus to detachably attach the bucket 108 to the link 106. In the above device, the bucket 108 can be attached to or detached from the link 106 by handling the lever 114 right and left.

However, the above device has a problem in that a complicated structure, including the top and bottom brackets, should be formed on the rear wall of the implement for detachably attaching the implement to the link. In addition, the sizes of the holes formed in the brackets of the implement are somewhat larger than the diameters of their associated pins of the link in order to let the pins move freely in the holes. However, the pins can not help playing in the holes due to the size difference between the pins and the holes. As the pins play in the holes as described above, the pins may break if they are subject to a sudden impact load while the construction equipment is performing work. In this regard, a serious problem may be caused in the durability of the above device.

In the typical implement attaching device shown in FIG. 2, a link 118 is coupled to an arm 116 by means of a pin 117. The opposite side ends of the link 118 are provided with levers 120. A key 119 which moves up and down in cooperation with movement of the levers 120 passes through the hole 123 of a bucket 121 after passing through the hole 122 of the link 118, thus to attach the bucket 121 to the link 118. The horizontal movement of the bucket 121 relative to the link 118 can be restricted by a pair of stoppers 124 formed on the opposite sides of the rear wall of the bucket 121. The detachable attachment of the bucket 121 relative to the link 118 is achieved by handling the levers 120 right and left.

However, the above implement attaching device has a problem in that it is difficult to separately handle the levers provided on the opposite sides of the link when the bucket is detached from the link. In addition, the above key projects out of the bucket so that the key may be easily broken due to outside impact applied thereto. When the key is suddenly broken during operation of the construction equipment, the bucket is separated from the arm and causes a safety accident.

U.S. Pat. No. 3,272,264 and Japanese Patent Laid-open No. Sho. 58-98532 disclose typical implement attaching devices. However, the above implement attaching devices have a problem in that each of them has a complicated linkage and a separate hydraulic cylinder as a power source. Both the complicated linkage and the hydraulic cylinder increase the cost of the devices.

Korean Patent Appln. No. 12146, which was filed on June, 1993 by this applicant, discloses an implement attaching device.

In the above Korean device, a link is hinged to an arm while the rear wall of the implement is provided with top and bottom guiders which support the top and bottom of the link respectively. A predetermined gap is defined between the top guider and the top of the link. The device also includes implement attaching means of the pantograph type which is received in the above gap and used for detachably attaching the implement to the link.

SUMMARY OF THE INVENTION

This invention is for further improving the implement attaching device disclosed in the above Korean patent application filed by this applicant and for achieving an improved attaching rigidity of the implement and an improved operational effect of the device.

It is, therefore, an object of the present invention to provide an implement attaching device for a construction equipment which has a simple construction and reduces the production cost of the device and achieves convenience, rapidity, rigidity and reliability when attaching the implement to an arm of the construction equipment using the device.

In order to accomplish the above object, the present invention provides a device for detachably attaching an implement to the arm of a construction equipment comprising: an implement mount link hinged to the arm; a first bracket provided on the rear wall of the implement and adapted for supporting the link vertically and horizontally; a pair of key holes provided on opposite sides of the first bracket; a pair of keys provided on the link such that the keys are horizontally movable relative to the link to be inserted into or taken out of the key holes and thereby detachably attaching the implement to the implement mount link; and means for linearly moving the keys horizontally.

BRIEF DESCRIPTION OF THE DRAWINGS

The above and other objects, features and other advantages of the present invention will be more clearly understood from the following detailed description taken in conjunction with the accompanying drawings, in which:

FIGS. 2A–2D are views of another embodiment of the typical implement attaching device;

FIG. 3A is an exploded perspective view of an implement coupling device for construction equipment in accordance with an embodiment of the present invention;

FIG. 3B is an enlarged perspective view of a portion of the device shown in FIG. 3A;

DESCRIPTION OF THE PREFERRED EMBODIMENTS

Figure 1:
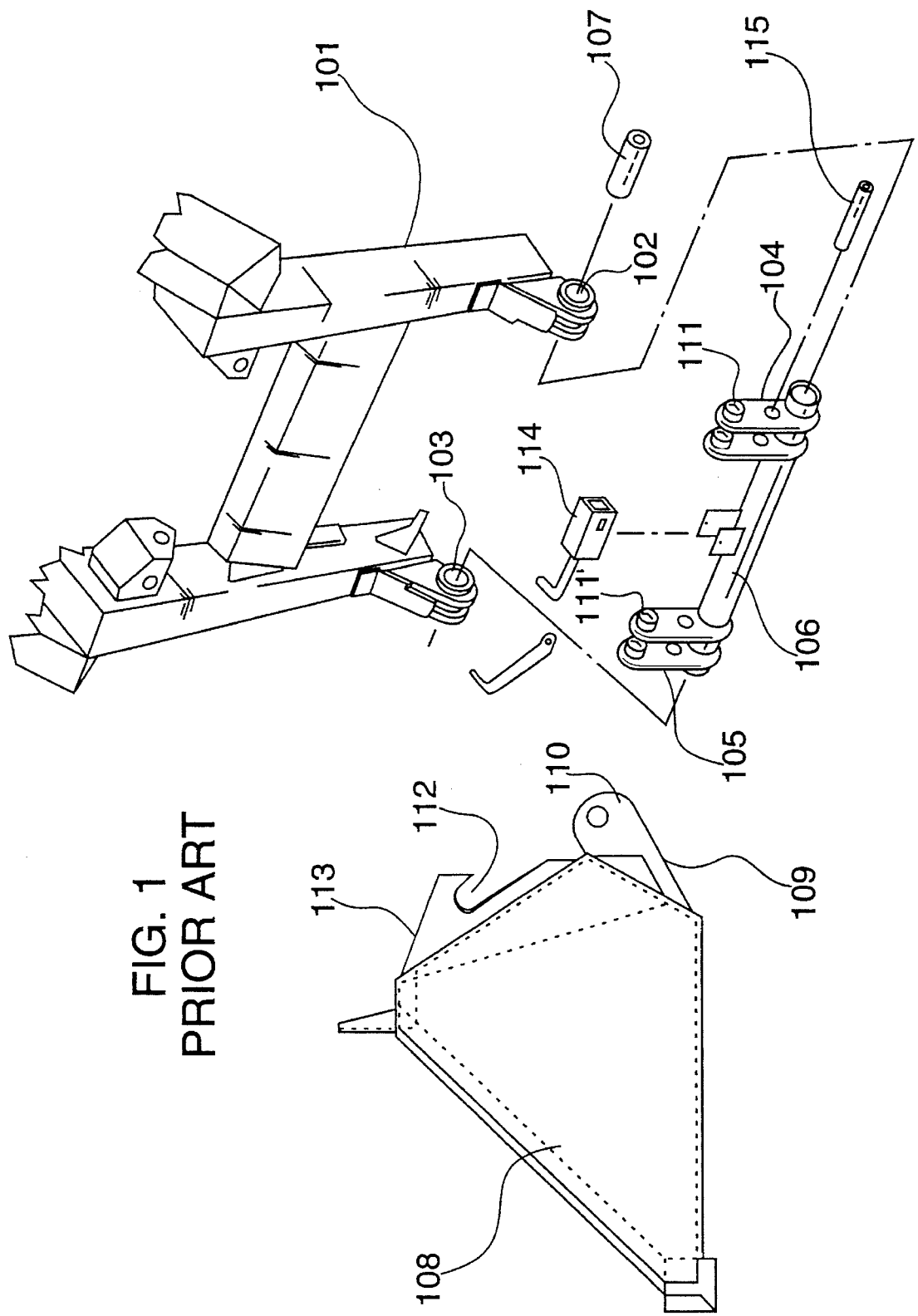
FIG. 1 is an exploded perspective view of an embodiment of a typical implement attaching device for construction equipment.
Figure 4:
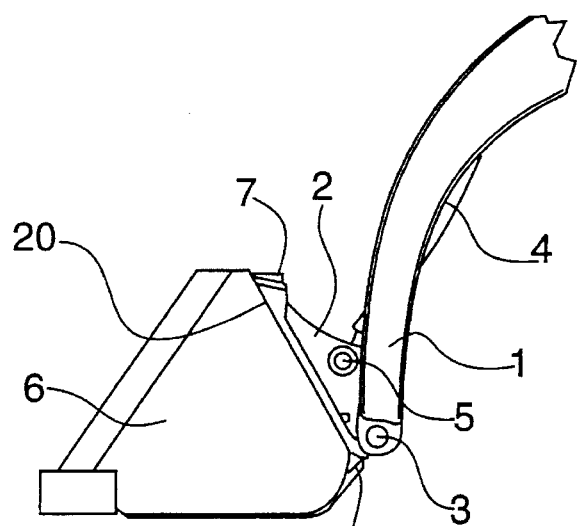
FIG. 4 is a side view of the implement attaching device of FIG. 3A.

With reference to FIGS. 3 and 4, there is shown an implement attaching device for construction equipment in accordance with an embodiment of the present invention. As shown in the drawings, a link 2 is pivoted to an arm 1 by means of pins 3. The opposite side portions of the rear wall of a bucket 6 are provided with first brackets 7 and 8, while the opposite ends of the link 2 are provided with second brackets 9. The bucket 6 is detachably attached to the link 2 by mounting each bracket 9 to an associated bracket 7, 8 of the bucket 6 under the condition that the upper and lower surfaces of each bracket 9 come into contact with the associated bracket 7, 8.

The first brackets 7 and 8 of the bucket 6 are provided with their key holes 11 and 11'. The key holes 11 and 11' receive keys 10 and 10' of the link 2 respectively, thereby detachably attaching the bucket 6 to the link 2.

The keys 10 and 10' are inserted into their associated key holes 11 and 11' as follows.

Engagement of the keys 10 and 10' with the key holes 11 and 11' for attaching the bucket 6 to the link 2 is basically achieved by a pantographic motion of key moving means. The key moving means includes a pantographic motion lever and linkage. The pantographic motion of the linkage is caused by turning the lever and adjusts the gap between the two keys 10 and 10' of the link 2 and thereby detachably attaching the bucket 6 to the link 2.

Figure 5A:
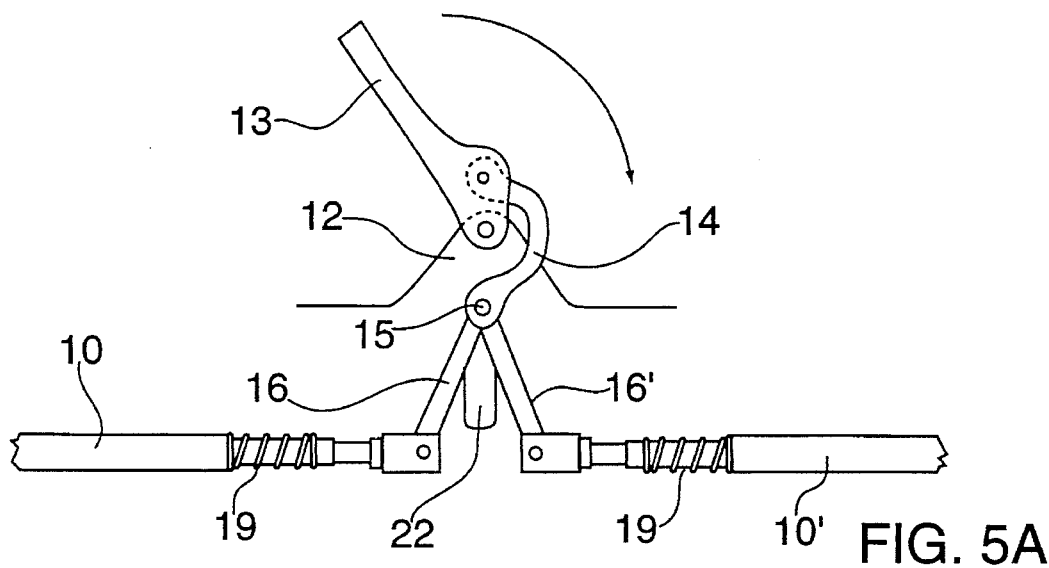
FIGS. 5A and 5B are views showing the implement attaching operation of the device of FIGS. 3A and 4.
Figure 5B:
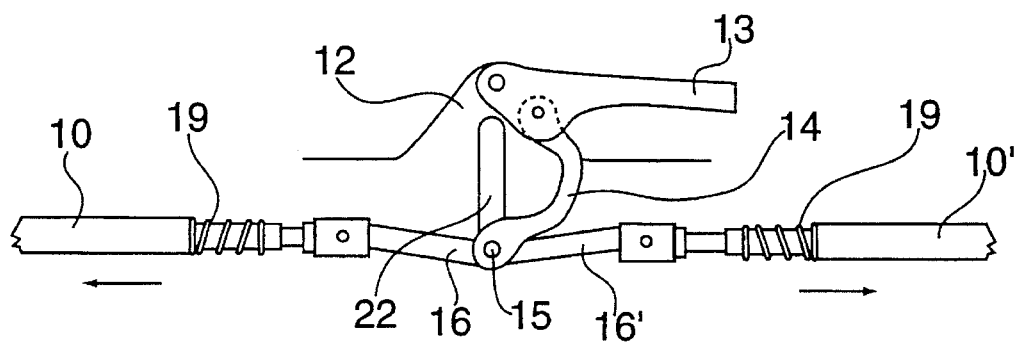

In the key moving means, a lever mount 12 is fixed to the top center of the link 2 as best seen in FIGS. 5A and 5B. The pantographic motion lever 13 is pivoted to the lever mount 12 by means of a pin such that the lever 13 can be turned within a predetermined angle.

The linkage of the key moving means includes a first link member 14. The first link member 14, whose center is bent into a U-shape, is pivoted at its top end to the bottom portion of the lever 13. The bottom end of the first link member 14 is provided with a guide wheel 15. This guide wheel 15 is movably received in a vertical guide slit 22, formed in the center of the link 2, such that the guide wheel 15 can be vertically moved under the guide of the slit 22. The linkage also includes a pair of second link members 16 and 16'. The top ends of the second link members 16 and 16' are commonly pivoted to the bottom end of the first link member 14 such that the second link members 16 and 16' can be turned about the bottom end of the link member 14 to achieve the pantographic motion. The bottom ends of the second link members 16 and 16' are hinged to left and right connectors 21 and 21' respectively. The left and right connectors 21 and 21' in turn are connected to the above keys 10 and 10' respectively, thus to make the second link members 16 and 16' cooperate with the keys 10 and 10'. A coil spring 19, 19' is provided between each connector 21, 21 and an associated key 10, 10'.

In FIG. 3, the reference numeral 20 denotes a stopper which is formed on each bracket 7, 8 of the bucket 6 to stop an associated bracket 9 of the link 6 and to prevent horizontal displacement of the link 2 relative to the bucket 6.

The operational effect of the above device will be described hereinbelow with reference to FIGS. 5A and 5B.

In the state of FIG. 5A, both the lever 13 and the first link member 14 are placed in their uppermost positions so that the second link members 16 and 16' are fully closed. The keys 10 and 10' in this case are placed in their innermost positions so that the keys 10 and 10' get out of their associated key holes 11 and 11'. The bucket 6 in this state can be thus detached from the link 2.

When the lever 13 is turned clockwise about the mount 12 as shown in FIG. 5B, the first link member 14 is moved down under the guide of the guide slit 22 of the link 2. In this case, the guide wheel 15 of the link member 14 linearly slides down in the guide slit 22. The second link members 16 and 16' are thus gradually opened. In the pantographic motion of the second link members 16 and 16', the second link members 16 and 16' temporarily achieve horizontality to fully extend the keys 10 and 10' outward. The members 16 and 16' are, thereafter, slightly turned down as shown in FIG. 5B. In this state, the keys 10 and 10' are stably inserted in their associated key holes 11 and 11' to detachably attach the bucket 6 to the link 2. The implement attaching device in this state may be unconsciously applied with a sudden outside force making the keys 10 and 10' leave their associated key holes 11 and 11'. However in the above device, the outside force merely biases the tops of the second link members 16 and 16' further downward so that no key suddenly leaves the key hole of the link 2. In this regard, the above device can achieve the stable attachment of the bucket 6 relative to the link 2 even though the device has no means for additionally fixing the lever 13 in the state of FIG. 5B.

As described above, the implement attaching device for construction equipment of the invention easily attaches detachably an implement, for example a bucket, to an implement mount link by simply handling a pantographic motion lever. The device also achieves the rigid and stable attachment of the implement relative to the implement mount link.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for detachably attaching an implement to an arm of construction equipment comprising:

an implement mount link hinged to said arm;

a first bracket provided on the rear wall of said implement and adapted for supporting said link vertically and horizontally;

a pair of key holes provided on opposite sides of said first bracket;

a pair of keys provided on said link such that the keys are horizontally movable relative to the link to be inserted into said key holes and thereby detachably attaching the implement to the implement mount link; and means for linearly moving said keys horizontally including
- a lever mount fixedly mounted to the top center of said implement mount link;
- a lever pivoted to said lever mount at a bottom end of said lever;
- a first link member pivoted to said lever at a top end of said link member;
- a guide wheel rotatably mounted to a bottom end of said first link member and movably received in a guide slit of the implement mount link such that the guide wheel is vertically moved and guided by the guide slit in accordance with a turning motion of said lever; and
- a pair of second link members, with top ends of said second link members being commonly pivoted to the bottom end of said first link member, and a bottom end of each of said second link members being pivoted to an inside end of a different one of said keys.

* * * * *